Feb. 19, 1957 L. PERAS 2,782,049
LOAD COMPENSATING DEVICE FOR RESILIENT SUSPENSIONS
Filed June 21, 1955 2 Sheets-Sheet 1
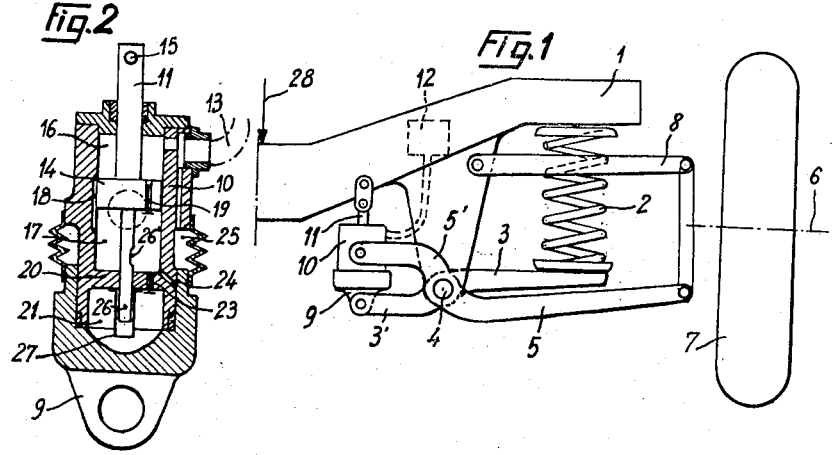
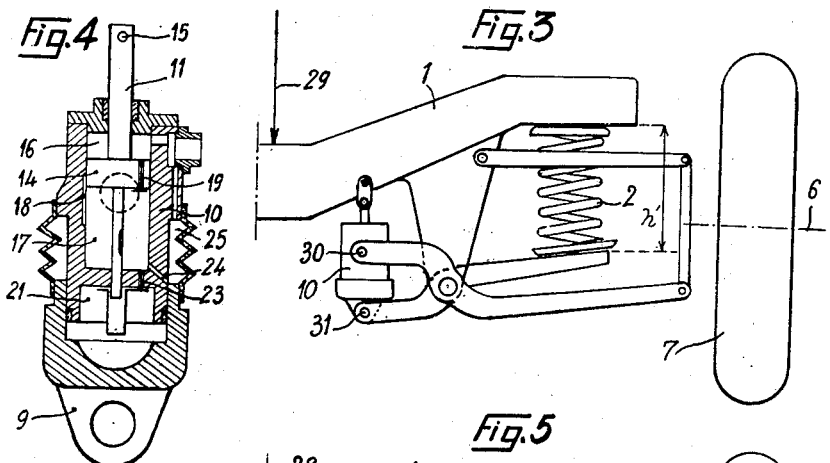
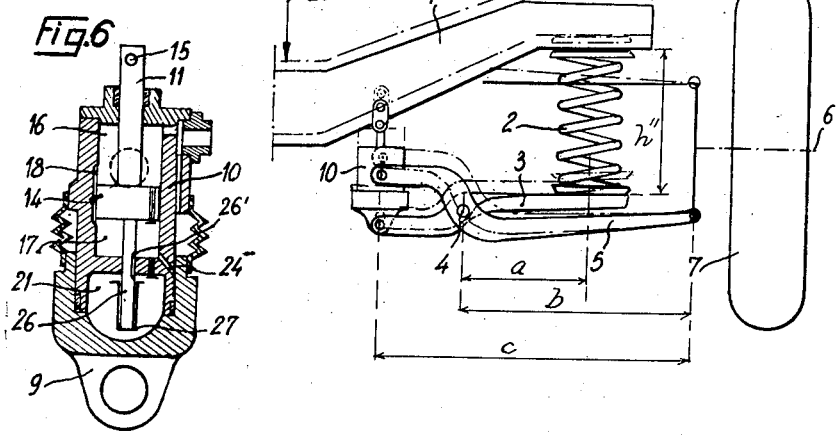

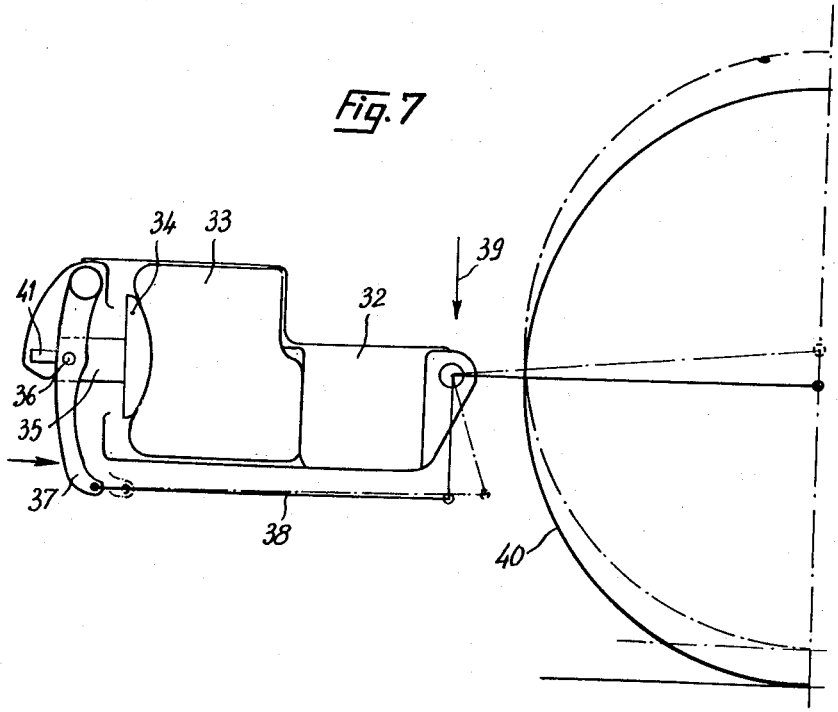

United States Patent Office 2,782,049
Patented Feb. 19, 1957

2,782,049

LOAD COMPENSATING DEVICE FOR RESILIENT SUSPENSIONS

Lucien Peras, Billancourt, France, assignor to Regie Nationale des Usines Renault, Billancourt, France Application June 21, 1955, Serial No. 516,909

4 Claims. (Cl. 280—124)

This invention relates to a device for compensating for variations in the load on a resilient suspension, particularly for keeping substantially constant the distance between the chassis and the wheel assembly of a vehicle regardless of any extra load on the vehicle.

It has already been suggested that the differences in height between the chassis and the wheels of a vehicle, which occur when the load on the latter varies, should be limited or even eliminated, by causing the inclination or the length of the connecting members joining the suspended portion of the vehicle to the wheel assembly to vary. This is achieved in the known systems by means of a hydraulic device comprising a pump driven by the engine of the vehicle, a pressure fluid accumulator and a valve, the displacements of which are controlled under the influence of the deflections of the body in relation to the wheel assembly.

The compensating device according to the invention enables the distance between the moving part and the fixed part of a suspension to be kept substantially constant solely as a result of the energy supplied by the deflection of the moving part. According to the invention a hydraulic installation mounted between these two parts of the suspension comprises a piston and a cylinder rigidly connected to the moving part and the fixed part respectively of the suspension, for example to the chassis and the wheel assembly of a vehicle. Pumping occurring in the installation as a result of the deflections of the suspension then causes, by means of suitably placed valves, extensions and reductions in length of the hydraulic installation, which repel or recall the moving part of the suspension system according to the amplitude of the load applied.

The embodiments of a compensating device according to the invention as applied to the resilient suspension of a road vehicle are hereinafter described, by way of example, with reference to the accompanying drawings, wherein:

Figure 1 illustrates diagrammatically one embodiment of the members of the suspension of a road vehicle when the latter is supporting an average load;

Figure 2 illustrates the hydraulic installation in the corresponding position;

Figure 3 illustrates diagrammatically the members in Figure 1 when the vehicle carries a greater extra load;

Figure 4 shows the hydraulic installation in the position corresponding to Figure 3;

Figure 5 shows diagrammatically the various positions occupied by the members in Figure 1 when the extra load ceases;

Figure 6 illustrates the hydraulic installation in the position corresponding to the condition in Figure 5;

Figure 7 shows another embodiment of the device.

As shown in Figure 1, the chassis 1 of a vehicle is supported by a spiral spring 2 which itself rests on a lever 3 articulated at 4 to a lever 5 which is connected to the axle 6 of the wheel 7, the levers 3 and 5 also being articulated to the chassis of the vehicle. A link 8 also connects the chassis to the axle.

The arms 3' and 5' of the levers 3 and 5 are also articulated respectively, by their free ends, to the cap 9 and the cylinder 10 of a hydraulic installation of which the piston rod 11 is fixed to the chassis 1. A fluid supply reservoir is shown diagrammatically at 12.

The hydraulic installation is illustrated in detail in Figure 2. It comprises the cylinder 10 supplied with fluid through the pipe 13 which communicates with the reservoir 12 (not illustrated in this figure).

The cylinder 10, which as stated above is connected to the lever arm 5', contains a piston 14, the rod 11 of which is fixed by its upper end 15 to the chassis 1. This piston divides the cylinder 10 into two chambers 16 and 17, which intercommunicate, under certain operating conditions, through a groove 18 made in the wall of the cylinder 10 and through a valve 19 provided in the piston.

The chamber 17 is bounded by a partition 20 which separates it from a chamber 21 formed by the end of the cylinder 10 and the cap 9 covering said cylinder. The chamber 17 communicates under certain operating conditions, with the chamber 21 through a valve 23. The wall of the cylinder 10 is also traversed by a duct 24 and the cylinder is surrounded by a space 25 of variable volume. The partition 20 is traversed by the piston rod 26 on which a groove 26' is provided. The end of the piston rod 26 is capped by a valve 27 in the form of a bell.

When an average load represented diagrammatically by the arrow 28 is supported by the chassis 1, the relative positions of the piston 14 and of the cylinder 10 are those illustrated in Figure 1 and Figure 2. The deflections of the suspension when the vehicle is travelling then causes a relative movement between piston and cylinder, the piston tending to force the oil out of the chamber 16 into the chamber 17. Nevertheless, the pressure does not rise in the chamber 17 because of the existence of the groove 18 which causes intercommunication between the chambers 16 and 17.

When a greater excess load, illustrated diagrammatically by the arrow 29 in Figure 3, is imposed on the chassis of the vehicle, the spring 2 is reduced in height. Consequently the cylinder 10 and the cap 9 are displaced in relation to the piston 14 which then occupies the position illustrated in Figure 4, in which communication between the chambers 16 and 17 through the groove 18 is interrupted. As the deflections of the suspension continue and the piston 14 continues to force the oil through the valve 19 into the chamber 17, the pressure rises in the latter, and opens the valve 23, and the oil enters the chamber 21.

The pressure in this chamber 21 then increases and repels the cap 9 until the outer end of the duct 24 is uncovered. The pressure drops in the chamber 17 as a result of the flow of oil into the space 25, and the cap 9 is immobilised in its new position. It follows that the distance between the points of articulation 30 and 31 of the cylinder and the cap has increased and consequently that the chassis 1 is maintained at the same level in relation to the wheel assembly as when it is only supporting an average load.

When the excess load disappears, that is to say when the body is only supporting the normal load 28, the spring 2 again extends (Figure 5). If $h'$ is the height of the spring in the case of the extra load (Figure 3) and $h''$ this height after the disappearance of the extra load (Figure 5), and if $a$ is the distance between the axis of the spring 2 and the articulation 4, $b$ the length of the lever arm 5 between the articulation 4 and the end carrying the axle 6, $c$ the distance between this latter end of the lever and the axis of the cylinder 10, it will be found that, after the removal of the extra load, the chassis of the vehicle returns upwards through a distance $$(h''-h')\frac{b}{a}$$

less than the distance $$(h''-h')\frac{c}{a}$$

of the rise of the cylinder 10.

Since, moreover, the piston 14 is fixed by its piston rod 11 to the chassis, this new relative displacement of the cylinder 10 in relation to the piston 14 brings the latter into the position illustrated in Figure 6. The chambers 17 and 16 again intercommunicate through the groove 18 and the pressure drops in the chamber 17. Moreover, the piston rod 26 raises the valve 27 and the pressure in the chamber 21 drops, the oil flowing through the groove 26' provided on the piston rod 26. The cap 9 resumes its initial position and the chassis is kept at the normal level.

Although the compensating device according to the invention has been described above as being applied to a spring suspension it can, of course, be adapted, within the scope of the invention, to any other system of resilient suspension. Thus Figure 7 illustrates a vehicle compressed air suspension equipped with the compensating device.

As shown in Figure 7, a compressed air reservoir 32 has a resilient portion 33 on which rests a plate 34 which plays the same part as the cap 9 in the preceding embodiment. The cylinder 35 of the hydraulic device is articulated at 36 to a lever 37. The latter is in turn articulated to a link 38, the load on the chassis being exerted on the suspension in the direction of the arrow 39. A vehicle wheel is shown diagrammatically at 40.

Since the piston 41 of the compensating device is fixed to the chassis, the operation of the suspension is such that the lever 37 tends to be displaced towards the right in the figure when a considerable extra load is supported by the vehicle chassis (position illustrated in broken lines). Otherwise, the operation of the compensating device is the same as described above, the device tending to maintain the mean position of the lever 37 and consequently that of the chassis.

I claim:

1. A device for compensating for variations in the average height of a resilient suspension comprising, in combination with a suspended member, a member sensitive to the load on the suspension, a cylinder articulated to said sensitive member, said cylinder having a delivery chamber, a fluid reservoir feeding said cylinder, a piston provided with a valve in said cylinder, a piston rod rigidly connecting said piston to the suspended member, a by-pass in the cylinder adapted to be uncovered according to the positions of the cylinder in relation to the piston, the cylinder having a head at one end and a cap slidable over said cylinder at said end, said cap and said head defining a secondary chamber, said piston having a rod extension extending through said head into said secondary chamber, said head being provided with a valve and said rod extension having a groove in its wall to provide communication between the secondary chamber and the delivery chamber of the cylinder, means defining a space of variable volume and said cylinder being provided with a port to establish communication between said delivery chamber of the cylinder and the space of variable volume, said port being covered and uncovered in selected positions of said slidable cap.

2. A compensating device as defined in claim 1 adapted to be applied to a spring suspension system of a vehicle having a suspension spring, a chassis and a wheel axle, wherein each sensitive member comprises two elbowed levers articulated to one another in the manner of tongs and to the chassis, said levers having arms connected to the suspension spring and to the wheel axle respectively, and having opposite arms articulated respectively to the slidable cap and to the cylinder, said piston being secured to the chassis.

3. A compensation device as defined in claim 1 adapted to be applied to a compressed air suspension system of a vehicle having a chassis and a compressed air reservoir wherein the surface of the sliding cap is constructed in the form of a plate resting against a resilient part of the compressed air reservoir, a lever displaced by the links of the suspension depending on the extra load on the chassis of the vehicle, said cylinder being articulated to said lever and the piston being secured to the chassis.

4. A device for compensating for variations in the average height of a resilient suspension comprising a hydraulic assembly disposed between the suspended member and the fixed member of said suspension, said assembly comprising a cylinder, a piston provided with a piston rod slidably positioned in said cylinder, and a cap slidable with respect to one end of said cylinder, said cylinder having a main chamber and said cap defining with the cylinder end a secondary chamber exteriorly of said main chamber, said two chambers being selectively placed into and out of communication in response to movements of said piston in the cylinder, and means defining a space of variable volume adapted to be selectively placed into and out of communication with said main chamber in response to movements of said cap in relation to the cylinder end, said piston rod being connected to the suspended member, said cylinder being connected to a member sensitive to the load on the suspension, and said cap being resiliently supported.

References Cited in the file of this patent

UNITED STATES PATENTS 1,255,328     Maegly                Feb. 5, 1918